United States Patent Office 2,746,965
Patented May 22, 1956

2,746,965

BIS-(N-SUBSTITUTED-3-CARBAMYLOXY-PIPERIDINIUM) ALKANES

John H. Biel, Milwaukee, Wis., assignor to Lakeside Laboratories, Inc., a corporation of Wisconsin No Drawing. Application November 2, 1953,
Serial No. 389,850

5 Claims. (Cl. 260—294.3)

This invention relates to derivatives of bis-(N-substituted-3-carbamyloxypiperidinium) alkanes and more particularly, the salts thereof.

I have discovered and synthesized a group of new and superior therapeutic compounds, particularly useful in producing ganglionic blockade and hypotension. The new compounds of this invention may be designated generally the derivatives of bis-(N-substituted-3-carbamyloxypiperidinium) alkanes, having the following structural formula:

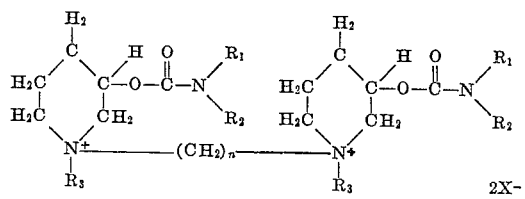

wherein $n$ is an integer of from about 2 to 10; $R_1$ is a lower alkyl or monocyclic aryl radical; $R_2$ is a lower alkyl, monocyclic aryl or an aralkyl radical in which the aryl group is monocyclic and the alkyl group of the aralkyl radical is a lower alkyl; $R_3$ is a lower alkyl or an aralkyl radical in which the aryl group is monocyclic and the alkyl group of the aralkyl radical is a lower alkyl; and X is the negative ion of a non-toxic acid. By a non-toxic acid I mean one that is non-toxic when taken in therapeutic dosages.

The compounds of this invention preferably are in the form of quaternary ammonium salts which are generally soluble in water. Examples of the salts which may be prepared include halide, sulfate, phosphate, tartrate, benzoate, acetate, citrate, cinnamate, mandelate, maleate, succinate, and the like.

Examples of the new compounds and their preparation are as follows:

Example 1,5 - bis-(N-methyl-3-N'N'-dimethylcarbamyloxypiperidinium)-pentane dibromide, having the structural formula:

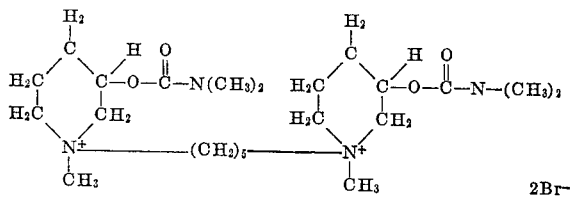

An aqueous solution containing 15 g. (0.068 mole) of N-methyl-3-N'N'-dimethylcarbamyloxypiperidine hydrochloride was made strongly alkaline with solid potassium hydroxide and extracted with ether. The ether extract was dried with potassium carbonate and the ether removed by distillation. The basic carbamate was dissolved in 50 cc. isopropyl alcohol and 7.83 g. (0.034 mole) of pentamethylene dibromide added. The mixture was allowed to stand at 30° C. The precipitate was collected and filtered and washed with acetone, yield 2.3 g. (11%) M. P. 241–243° C.

Anal.—Calcd. for $C_{23}H_{46}Br_2N_4O_4$: Br, 26.58; N, 9.31. Found: Br, 26.85; N, 9.21.

Other examples of the new compounds are as follows:

A. 1,10-bis-(N-2'-phenethyl-3-N'N'-diphenylcarbamyloxypiperidinium)-decane dibromide:

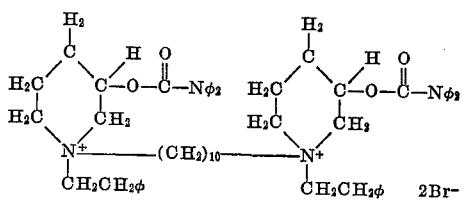

B. 1,6-bis-(N-n-hexyl-3-N'-phenyl-N'-benzylcarbamyloxypiperidinium)-hexane-dibromide:

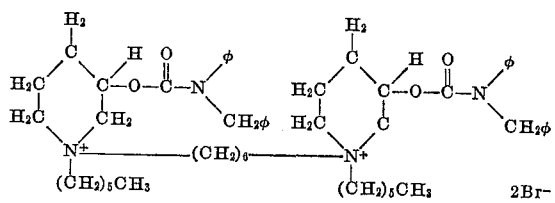

C. 1,5-bis-(N-methyl-3-N'N'-dibutylcarbamyloxypiperidinium)-pentane dibromide:

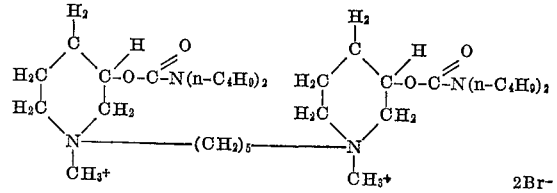

D. 1,2-bis-(N-methyl-3-N'N'-dimethylcarbamyloxypiperidinium)-ethane dibromide:

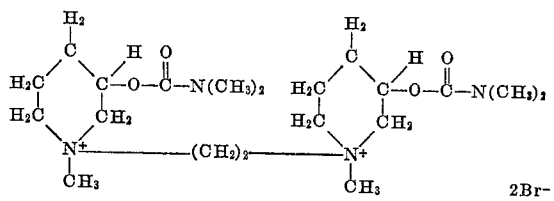

The foregoing detailed description is given for clearness of understanding only and no unnecessary limitations should be understood therefrom as modifications will be obvious to those skilled in the art.

I claim:

1. A member of the group consisting of compounds of the formula:

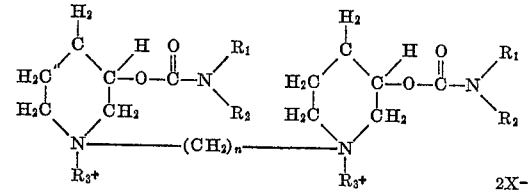

wherein $n$ is an integer from 2 to 10; $R_1$ is a member of the class consisting of lower alkyl and monocyclic aryl radicals; $R_2$ is a member of the class consisting of lower alkyl, monocyclic aryl and aralkyl radicals in which the aryl group is monocyclic and the alkyl group of the aralkyl radical is a lower alkyl; $R_3$ is a member of the class consisting of lower alkyl and aralkyl radicals in which the aryl group is monocyclic and the alkyl group of the aralkyl radical is a lower alkyl; and X is the negative ion of a non-toxic acid.

2. The composition of claim 1 wherein $R_1$, $R_2$, and $R_3$ are methyl, $n$ is 5 and X is Br.

3. The composition of claim 1 wherein $R_1$ and $R_2$ are phenyl, $R_3$ is phenylethyl, $n$ is 10, and X is Br.

4. The composition of claim 1 wherein $R_1$ is phenyl, $R_2$ is benzyl, $R_3$ is n-hexyl, $n$ is 6, and X is Br.

5. The composition of claim 1 wherein $R_1$ and $R_2$ are n-butyl, $R_3$ is methyl, $n$ is 5, and X is Br.

References Cited in the file of this patent

UNITED STATES PATENTS

| | | |
|---|---|---|
| 2,477,937 | Paul et al. | Aug. 2, 1949 |
| 2,533,003 | Feldkamp | Dec. 5, 1950 |

OTHER REFERENCES

Paul: Compt. rend. (Fr. Acad. Sci.), vol. 221, No. 15, pp. 412–4 (1945).

Paul: Compt. rend. (Fr. Acad. Sci.), vol. 221, pp. 560–2 (1945).

Chen et al.: Chem. Abst., vol. 46, col. 6263 (1952).